(12) United States Patent
Kearney et al.

(10) Patent No.: US 10,317,422 B2
(45) Date of Patent: Jun. 11, 2019

(54) MULTI-DIRECTIONAL FLUID VELOCITY MEASUREMENT DEVICE (FVMD)

(71) Applicant: Dublin Institute of Technology, Dublin (IE)

(72) Inventors: Derek Kearney, Walkinstown (IE); Brian Kearney, Dublin (IE)

(73) Assignee: Technological University of Dublin, Dublin (IE)

( * ) Notice: Subject to any disclaimer, the term of this patent is extended or adjusted under 35 U.S.C. 154(b) by 0 days.

(21) Appl. No.: 15/553,563

(22) PCT Filed: Feb. 19, 2016

(86) PCT No.: PCT/EP2016/053566
§ 371 (c)(1),
(2) Date: Aug. 24, 2017

(87) PCT Pub. No.: WO2016/135061
PCT Pub. Date: Sep. 1, 2016

(65) Prior Publication Data
US 2018/0045751 A1  Feb. 15, 2018

(30) Foreign Application Priority Data

Feb. 25, 2015 (GB) .................................. 1503149.5

(51) Int. Cl.
*G01P 5/165* (2006.01)
(52) U.S. Cl.
CPC .................................. *G01P 5/165* (2013.01)

(58) Field of Classification Search
CPC .............. G01F 1/46; G01B 5/14; G01P 5/165
See application file for complete search history.

(56) References Cited

U.S. PATENT DOCUMENTS

| 5,929,331 A | 7/1999 | Kinser et al. |
| 6,279,393 B1 | 8/2001 | McLaughlin |
| 2002/0121135 A1 | 9/2002 | Rediniotis |
| 2005/0005695 A1 | 1/2005 | Corey et al. |
| 2014/0130608 A1 | 5/2014 | Adams |

FOREIGN PATENT DOCUMENTS

| CN | 1367389 A | 9/2002 |
| CN | 202075303 U | 5/2011 |
| CN | 102298072 A | 12/2011 |
| EP | 0947809 A2 | 10/1999 |
| WO | 2007/042803 A1 | 4/2007 |
| WO | WO 2007/042803 A1 | 4/2007 |

OTHER PUBLICATIONS

Search Report under Section 17(5), dated Jan. 21, 2013, Intellectual Property Office, Great Britain.

(Continued)

*Primary Examiner* — Jewel V Dowtin
(74) *Attorney, Agent, or Firm* — Holzer Patel Drennan (57) ABSTRACT

This present application relates generally to the science of fluid flow measurement and provides a multi-directional fluid velocity measurement device (FVMD) employing a plurality of pitot tubes arranged in a 3D configuration and extending from a spherical main body in which measurement sensors are provided.

19 Claims, 4 Drawing Sheets

(56) References Cited

OTHER PUBLICATIONS

International Standard, IEC 61400-12-1, First Edition, Dec. 2005, Wind Turbines, Part 12-1: Power performance measurements of electricity producing wind turbines.
Eckman, et al., "A Pressure-Sphere Anemometer fr Measuring Turbulence and Fluxes in Hurricanes", Journal of Atmospheric and Oceanic Technology, vol. 24, Oct. 18, 2006.
Friis Pedersen, Troels, "Development of a Classification System for a Cup Anemometers—CLASSCUP", Riso National Laboratory, Roskilde, RISO-R-1348 (EN), Apr. 2004.
Kadygrov, E.N., "Integrated Profiling Systems and Other Upper-Air Measurement Techniques", World Meteorological Organization, Nov. 16, 2005.
International Search and Written Opinion, dated Apr. 14, 2016, WO.

MULTI-DIRECTIONAL FLUID VELOCITY MEASUREMENT DEVICE (FVMD)

FIELD OF THE APPLICATION

This application relates generally to the science of fluid flow measurement and, more particularly provides a multi-directional fluid velocity measurement device (FVMD).

BACKGROUND TO THE APPLICATION

Accurate wind measurements are essential in various applications and for various industries. In the wind industry, the miscalculation of wind resources for electricity generation is an industry wide problem. Industry estimates suggest that wind developers are inaccurately predicting the pre-construction energy yield estimates of wind farms by ten percent on average globally: Site selection is the first crucial step in the practical development of these farms and investors decide whether or not to invest on the basis of wind resource assessment reports. Typically, these reports require a rigorous assessment of site-specific wind conditions over a twelve-month period before any significant investment proceeds. Industry experts suggest that existing wind measurement technology is not up to the task of providing sufficient data for an accurate assessment of a site's wind resource potential. A second problem identified is with the ongoing operation of so-called horizontal axis wind turbines (HAWT) once installed. Misalignment of the yaw angle of a HAWT with the incident wind is apt to cause significant variation in power output (as well as inducing additional stress loads on the critical components of the turbines causing premature wear and tear and accelerating the maintenance cycle). For example, a yaw angle misalignment of ±15° will lead to a 5-6% annual energy loss. Turbine misalignment is a common phenomenon particularly in lower wind speed conditions where yaw angle misalignments of up to 30% are common across the industry.

These problems are exacerbated when HAWTs are located in complex terrains. Trials conducted in Warwick have shown that the likely or predicted energy output from building-mounted micro-wind turbines are prone to overestimation by factors of between 15 and 17.

Current approaches to addressing the problems of wind resource measurement may be generally categorized into discreet families of devices as follows: Mechanical anemometry (cup and vane); active remote sensing technology (SoDAR and LiDAR); hot-wire anemometry; sonic anemometry, and; pitot-tube anemometry and subdivisions thereof.

PRIOR ART APPROACHES

Mechanical anemometry: Cup anemometers and wind vanes dominate in wind energy measurement applications. The former, though varying in size, cup-shape and arm-length usually comprise some configuration of three cups arranged (coplanar) on a horizontal plane such that they ideally rotate around a vertical shaft at a speed proportional to the horizontal speed component of the incident wind. Wind vanes are used to indicate wind direction and typically comprise an asymmetrical marker-vane which is free to rotate about a vertical axis over the entire (azimuthal) 360° degree range so that it assumes a direction parallel to the direction of the mean wind flow. Data from the latter are used by the industry to facilitate the optimum alignment of the turbine blades to the incident wind. Typically, mechanical rotating anemometers generate an analogue output signal by means of a so-called reed switch or through the pole interaction of a magnet to a coil.

The International Electrotechnical Commission (IEC) Standard 61400-12-1:2006, relating to wind turbines, exclusively prescribes the use of cup anemometers and wind vanes to gather the data necessary for the calculation of power performance measurements of electricity producing wind turbines. In other words, the power curve gives the predicted wind turbine power production estimate for a particular wind speed. According to this standard, the power characteristics of an HAWT are determined by the measured power curve and the estimated annual energy production (AEP)—See IEC 61400-12-1: 2006 Wind Turbines—Part 12-1: Power performance measurements of electricity producing wind turbines (pp. 7). The measured power curve is determined by ' . . . collecting simultaneous measurements of wind speed and power output at the test site for a period that is long enough to establish a statistically significant database over a range of wind speeds and under varying wind and atmospheric conditions. The AEP is calculated by applying the measured power curve to reference wind speed frequency distributions, assuming 100% availability' (p. 7).

Although the cup anemometer has long been considered a robust and suitable instrument for wind speed testing, international standards authorities and industry experts are becoming ever more aware of the technical limitations of using this instrument as a speed measurement device. Users of the IEC standard (see above) are cautioned to be aware of the large differences that arise from variations caused by wind shear and turbulence. Optimally, cup anemometers are designed to measure the direct, incoming homogenous laminar wind flow and thus, field flow conditions associated with fluctuating wind vectors, both in magnitude and direction will cause different instruments to perform differently in the same conditions (P. 7).

The technology has recently come under close scrutiny from the wind industry where multi-million euro investments are based on the so-called "bankable datasets" derived from traditional cup anemometer readings. The issue that arises is that small errors in wind speed measurement are apt to translate into much larger deviations in the predicted power output of an HAWT. The EU funded wind trial project SitePariden (2001) discovered that average wind speeds measured with different cup anemometer types—including pre-calibrated instruments—deviated by up to 7% points relative to each other. The effect of these observed differences on the estimated wind energy production is not trivial and could account for a 10% miscalculation of the resource in reasonable wind regimes of nine meters per second and up to 20% in sites with mean wind speeds of less than five meters per second.

As well as differences between cup anemometers, a number of inherent design limitations have been identified. Firstly, the CLASSCUP project has shown that cup anemometers have significant difficulties with producing accurate readings in angled or off-axis flow conditions when the flow exceeds 15 degrees in either a negative or positive direction [Friis Pedersen, T., Risø National Lab, Roskilde (DK)—Wind Energy Department, 2003—Development of a classification system for cup anemometers—CLASSCUP].

Secondly, aerodynamic over-speeding (a known behavioural response-effect commensurate with the friction-bearing characteristics of the instrument) has been identified as a potential source of bias in wind speed data, especially in high or fluctuating wind conditions. Thirdly, industry sources have identified a self-excited vibratory phenomenon termed dry friction whip (DFW) whereby affected anemometers can report wind speeds lower than true speeds by up to several percent.

Finally, and because cup anemometers and wind vanes are, essentially, rotating mechanical devices, there are several external parameters known to have a deleterious effect on rotational function: inter alia, the effect on the rotating instrument's friction bearings due to extreme temperature variations; the stalling effect of heavy snow; and, the effect on rotatory function due to the accretion of ice and rime in cold weather. Human error may also play a part in yaw misalignment of HAWTs as a wind vane need only be misplaced by a few millimeters in order to induce a major misalignment. For example, a 5 to 6 millimeters turn of some wind vanes induces a 15° yaw misalignment causing a 5 to 6% annual energy loss. These are significant problems for the wind energy sector not least because minimal errors in wind speed measurement lead to significant error accumulation in all subsequent calculations based on these core measurements (according to Betz's Law the power output from an ideal HAWT is proportional to the blade- or swept-area and the wind speed cubed). To overcome these issues, various attempts have been made in prior art to measure wind using other than mechanical rotational devices.

Active remote sensing technologies (SoDAR and LiDAR): Sonic detection and ranging (SoDAR) and light detection and ranging (LiDAR) are two so-called active remote sensing technologies that rely on sound (pulsed acoustic energy) and light (pulsed laser light), respectively, to measure wind profiles. These, typically ground-based, systems generally operate by emitting sound and light pulses vertically at known intervals and then determining wind direction and speed by measuring both the intensity and the frequency (Doppler shift) of the back-scattered (reflected) sound in the case of the SoDAR and back-scattered light (from airborne sub-micro-particles) in the case of the LiDAR. Wind profiles at various heights (up to hundreds of meters) may be obtained by analysing the return signal at a series of times following the transmission of either sound or light pulses (the return signals recorded at any particular delay interval will provide three-dimensional wind profile data for a height that can be calculated based on the speed of sound and light respectively).

While active remote sensing technologies offer some distinct advantages over in-situ mechanical anemometers, there are several drawbacks, not least of which are cost, size and complexity. Another consideration is that remote sensing technologies typically provide mean data only, as data on standard deviations (e.g. wind-speed, -direction and -gust), are usually either not available or unreliable. This is because remotely sensed values are more likely to be averages over some volume that is related to a beam width or pulse length, whereas in-situ sensors—such as cup anemometers—sample instantaneously at a known point in time and space (point-measurements). In addition, the signal processing algorithms for acoustic systems require extensive filtering to ensure a good signal-to-noise measurement because SoDAR performance is adversely affected by environmental noise pollution and reflections of the pulse from ground obstacles (ground clutter). LiDAR system performance is equally inhibited in heavy fog, cloud, and other conditions with high aerosol concentration. Perhaps most significantly, is the fact that both SoDAR and LiDAR applications generally do not report valid data during periods of snow, strong winds, and heavy rain which, in turn, mitigates against their sole deployment in extended wind trials such as those required for wind farm site assessments. According to an independently written report from the World Meteorological Organisation the differences between remotely sensed and point measurements can cause ' . . . problems with comparison, interpretation and validation of data, and their use in models, and with continuity of historical records' (P. 1)—See Kadygrov, E. N. (2006) World Meteorological Organisation: Instruments and Observing Methods Report No. 89—Operational aspects of different ground-based remote sensing observing techniques for vertical profiling of temperature, wind, humidity and cloud structure: A Review, WMO/TD-No. 1309.

Hot-wire anemometry: The hot-wire anemometer is, essentially, a thermal anemometer. The measuring principle is based on the relationship between the electrical resistance of the fine wire that is used (e.g. tungsten) and the flow speed of a passing fluid (e.g. air). As wind passes over the electrically heated wire it tends to cool by way of convective heat transfer thus changing the resistance of the wire conductor by an amount that is proportionate to wind velocity. In other words, the heat loss to fluid convection is a function of the fluid velocity. With the capability of high frequency-response and fine spatial resolution, hot-wire anemometry is particularly useful for measuring turbulent flows, or any flow within which rapid velocity fluctuations are of interest. The limitations of this technology are that the instruments are orientation sensitive and in isolation cannot determine wind direction. The devices are also unsuitable for industrial deployment as the thinness of the wire normally used is highly susceptible to damage. The device is also prone to malfunction in so-called "dirty flows" wherein accumulated debris on the wire conductor can change the resistance, as can any form of natural precipitation.

Sonic anemometry: Sonic anemometry operates on the principle that the time required for a sound wave to travel (between paired sonic transducers located at a known fixed distance apart) is effected in a way that is proportionate to the wind speed that passes through the gap between the transducers. Pairs of sonic transducers may be further combined to yield a measurement of fluid velocity in one-, two- and three-dimensional flow. As with hot-wire anemometry the high frequency-response of these devices, along with fine spatial resolution, make sonic anemometers useful for measuring turbulent flows. The disadvantages are that these instruments are known to be adversely affected by environmental noise pollution of any sort. In a further limitation, it has found that when the sonic transducers become coated with water (even in light precipitation, or are struck by large raindrops, the output is severely compromised. One of the main drawbacks of this instrument, however, is the distortion of normal flow (shadowing) characteristics caused by the device's own housing arrangement for the transducers. A procedure known as "shadow correction" is required to be performed in a wind-tunnel facility which creates a "look-up" table of correction factors to be applied so as to adjust the wind speed output according to its sensitivity to the particular off-angle position from the incoming flow stream.

Pitot-tube anemometry: The concept of measuring fluid flow velocity using a simple tube arrangement is known in prior art since at least the early 18th century and operates on the known principle that a moving fluid exerts pressure on any object placed in its path. The basic Pitot Tube—so-called after the inventor Henri Pitot—comprises a straight tube, sealed at one end, with the open end oriented directly into the fluid flow. As the tube itself will contain the fluid within which it is immersed, a pressure can be measured (the moving fluid is brought to rest, it stagnates, within the tube as there is no outlet to allow flow to continue). This pressure is the "stagnation pressure" of the fluid and the point at which the dynamic flow meets the standing fluid is known as the "stagnation point". If the stagnation pressure can be determined and the static pressure is a known quantity, and the enveloping fluid may be classified as incompressible (e.g. air or water), then Bernoulli's Equation may be applied to determine point measurements in the fluid velocity. The simple pitot-tube (and its variants) continues to be used on aircraft to measure airspeed; in marine applications to measure the speed of a vessel through water; and, in various industrial applications to measure the local velocity at a given point in space and time in the flow-stream of any given fluid (e.g. in gas pipes and air ducts). The family of devices known under the general category of pitot-tube anemometers may be further subdivided into two discreet subtypes: Multi-Hole Pressure Probes (MHPs) and Multi-Tube Pressure Probes (MTPs).

Multi-Hole Pressure Probes (MHPs) are a derivation of the pitot-tube concept. However, the principle of measurement used with MHP technology is somewhat different and is based on taking pressure measurements at distinct points on the surface of a bluff body immersed in a fluid stream. The contour of the bluff body and the positioning of the pressure ports are therefore critical computation elements requiring careful selection, positioning and calibration—in practice the calibration procedure tend to be experimental as opposed to analytical. Conventional MHPs comprise several small diameter tubes axisymetrically arranged inside a larger tube with one end machined into the shape of the so-called "probe" or "tip" of the MHP. Many different tip (or probe) shapes have been deployed in MHP technology including spherical, conical, faceted and cylindrical surfaces. The known relative position of each pressure port on the surface of the bluff body (i.e. the probe tip) allows calculation of both a flow direction and a flow magnitude. A three-hole probe is capable of measuring a single flow angle—that is, measuring a two dimensional flow. Five and seven-hole probes are capable of determining two flow angles—allowing a fully three dimensional velocity field to be measured. The two additional holes allow seven-hole probes to measure higher angles of attack in the order of 150° (the so-called cone angle) than five-hole probes.

U.S. Pat. No. 5,929,331 (Kinser, R. E. and Rediniotis, O.K.), discloses a multi-directional velocity measurement probe with eighteen ports purportedly extending the measurable range of velocity inclinations to a cone angle in the order of about 340°. In Kinser, the body of the probe tip intrudes into the flow stream. At the probe tip, there is internal micro-machining of the probe tip to allow for separate measurement points about the probe tip. In this context, it is to be noted that the suggested tip or probe diameter is 6.14 mm. It will be appreciated that micro-machining this is complex, expensive and generally impractical to manufacture in the suggested configuration. Furthermore, and as a function of the operating principle of MHP technology, it has been shown that any imperfections whatsoever on the surface of the probe tip, such as slight indentations, burrs, scratches or adherences has the potential to severely compromise the flow data produced by the instrument.

Eckman, R. M, et al., A Pressure-Sphere Anemometer for Measuring Turbulence and Fluxes in Hurricanes, Journal of Atmospheric and Oceanic Technology 2007; 24: 994-1007 disclose a further derivation of MHP technology specifically for use in measuring the extreme wind turbulence encountered in tropical cyclones. Therein is described an experimental instrument called the Extreme Turbulence (ET) probe, which the authors further describe as a "pressure-sphere anemometer". In Eckman, the probe tip comprises a 43 cm diameter polished fibreglass sphere (divided into two hemispheres split along a vertical seam), with three rows of pressure ports running horizontally around the sphere. Within each row, the ports are situated at 36° apart yielding a total of 30 pressure ports on the surface of the probe. Each of the 30 external ports is connected via plastic tubing to an array of individual, PCB mounted, analogue pressure sensors located within the sphere (a data acquisition module, positioned below this PCB, receives analogue input from the board-mounted sensors via a 26-pin ribbon cable and outputs the digitised data through a USB cable). In general operation, the ET system must first locate the pressure port closest to the velocity stagnation point of the sphere: pressure measurements, provided by the ports nearest the stagnation point, are then used to compute the three-dimensional velocity vector.

The first ET probes were built using "pinhole ports" of 1 mm diameter so as to provide minimal disruption of the spherical surface of the probe tip (and to maximise the space inside the sphere by using small diameter pressure tubing to connect to the sensors). However, field tests showed that when raindrops strike a pinhole port, the pressure sensor registered large transient spikes in the output data (causing the acquisition software to misidentify the location of the stagnation point on the sphere). In a second aspect, the pinhole ports were enlarged to 6.4 mm in diameter. This, in turn, caused a problem with water ingress fouling the port sensors which was resolved by arranging the now larger connecting tubes in such a way as to provide gravity drainage to prevent water from entering the device (an active defence mechanism involving continuous pneumatic back-flushing was considered and rejected by the authors in favour of this passive drainage system). Increasing the diameter of the port causes other issues not considered pertinent by the authors, interested as they are, in hurricane-force winds only. The issue is that data contamination may occur, most especially at lower wind speeds, due to the fact that the pressure ports themselves can act as vortex generators, triggering an earlier transition to turbulent flow. However, the main limitation of this device is that—like other pressure spheres—it does not function well at low airspeeds (i.e. low relative to cyclonic air speeds). Field trials with the ET probe indicated that velocity measurements increasingly drop out once airspeeds fall below roughly eight meters per second i.e. when the dynamic pressure is at about forty Pascal.

The prior art is replete with examples of MHP technology adapted specifically for wind measurement. For example, U.S. Pat. No. 2,701,474 (Goudy, P. R.) issued Feb. 8, 1955 (see FIG. 10), describes a multiple pressure tube arrangement for the measurement of wind direction and velocity. What is described in the patent is, in effect, a precursor to present day MHP technology. Therein, the bluff body of the probe comprises a substantially flat Pitot probe head, shaped as two very flat truncated cones joined by a short cylindrical surface at the larger diameter. Two pairs of oppositely faced pressure ports, spaced in quadrature, are located on the surface of the cylindrical midsection with an angular separation of 90°.

In another example, Japanese Patent Application JP57100352 A, published Jun. 22, 1982, discloses a probe head in the shape of disc-type hollow case, rounded at the perimeter to attenuate flow disturbance. Dynamic or total pressure ports (8 in number) are positioned coplanar on the curved surface of the disc-type probe at an angular separation of 45°; UK Patent Application GB2379026 A (Read, F. E.), published Feb. 26, 2003, discloses a similar multiple pitot-tube arrangement comprising a hollow disc-like body (or probe) having a cylindrical peripheral wall with up to sixteen counter-sunk pressure ports (described as holes flared out towards the outer surface of the peripheral wall) positioned coplanar around a vertical axis at an angular separation of 22.5°. The positioning of the pressure port openings on the outer surface of these various shaped probe heads leaves these particular devices prone to the same limitations as the pressure sphere anemometer previously described (see Eckman et al., para. 230-235 above). Furthermore, in each of the cases described, the coplanar positioning of pressure ports around a vertical axis, limits these devices to measuring the horizontal component only of wind speed and direction. A further example of such a construction is that of U.S. Pat. No. 5,929,331, which has a spherical probe head with a plurality of ports openings on the surface at which pressure is measured.

Multi-tube pressure probes (MTPs): Various attempts have been made in the prior art to develop a method of measuring wind speed and direction utilising multiple pitot-tube arrangements. What distinguishes this prior art from MHP applications is a common design feature including a plurality of pitot tubes positioned equiangularly over 360° and extending outwards horizontally-coplanar from a vertical central axis directly into the free flow stream. Typically, the pitot-tubes are, in turn, connected to individual differential pressure transducers via pressure tubing of various material types, lengths and diameters. The pressure transducers convert the dynamic pressure signal from the pitot-tubes into an electrical (analogue) signal which is further typically routed to a signal conditioner/amplifier and, further to an analogue-to-digital (A2D) converter for signal conversion. The digital output data is then routed for further processing/filtering of the data, oftentimes using bespoke algorithms.

An example in the prior art of a device using these design principles is described in International Patent No. WO2007/042803 A1 (Shields, J. A.), issued Apr. 19, 2007. This patent discloses an instrument for determining the horizontal speed and direction of movement of a fluid relative to a body, said device comprising a plurality of pitot-tubes or probes, arranged at a fixed annular separation in a common horizontal plane and aligned with a common central axis. The pitot-tubes (numbering 5 at 72° annular separation) are connected to individual analogue output pressure sensors via lengths of plastic tubing (so-called "connection pipes") up to 10 meters in length (in Shields, the bank of pressure transducers and the so-called "algorithm unit" are located remotely from the probe tip itself).

Variations on a theme similar to that described by Shields (2007) have been described in prior art: US Patent Application No. 2005/0005695 A1 (Corey, H. S. and Lane, B.), issued Jan. 13, 2005 which describes a differential pressure wind meter, comprising a plurality of pitot-tubes (six in number at 60° angular separation) aligned horizontally coplanar within a lobed housing, each connected to individual micro-electro-mechanical (MEM) differential pressure sensors via lengths of tubing; and subsequently described in, Chinese Patent No. CN202075303 U (Huiqiang Tang et al.,) published Dec. 14, 2011, comprising four, rather than five, mutually perpendicular pitot-tubes arranged horizontally around a vertical central axis (connected to four matched differential pressure sensors).

Although not specifically wind related: European Patent Application No. EP0947809 A2 (Mostardi-Platt) published Jun. 6, 1999, discloses a method and apparatus for measuring a cross section of gas flow in a conduit such as a stack or duct. This specification describes using a plurality of a variation of the basic pitot-tube known as s-type pitot-tubes (16 in number) arranged in a coplanar configuration oriented to the incident flow stream in a conduit. The stated object of this latter device is to monitor and indicate flow measurements at a cross-section in the normally unidirectional flow encountered in a conduit such as an emission stack or duct.

Thus configured, the output from these various MTP devices simply attempt to mimic the data output expected of mechanical cup anemometers and wind vanes, and are thus incapable of providing the three-dimensional flow profile data so needed by the wind and other industry sectors. Furthermore, said devices cannot account sufficiently for wind shear and/or wind flow inclination, vertical wind vectors and wind turbulence characteristics.

The use of devices of the type very generally described above has not been restricted to measuring wind speed and in this respect US2014/0130608 is an unusual example where a small number of pitot tubes are arranged inside a sphere with the openings of the pitot tube being at the surface of the sphere. The device is unusual in that it is for measuring the speed and direction of a diver's movements and hence the position of the diver when underwater.

SUMMARY

What is evident from the review of the foregoing prior art is that there is a number of problems in the art. The present application is directed at providing a robust measurement device capable of providing a plurality of reliable point-measurements in three dimensions. The instrument described herein is able to measure wind shear and/or wind flow inclination, vertical wind vectors and wind turbulence characteristics.

Moreover, and whereas conventional mechanical anemometers are somewhat adequate for measuring mean wind speeds, there is a general need for a device capable of following and recording the higher frequency wind fluctuations that are ever-present in real-world situations and capable too of measuring directly the input quantity of interest i.e. the dynamic pressure. Advantageously, the present application provides an instrument that can measure these and indeed offers a number of further advantages.

Accordingly, the present application provides a FVMD instrument in accordance with the claims which follow.

BRIEF DESCRIPTION OF THE DRAWINGS

To facilitate a more complete understanding of the present application and its technical and commercial advantages, attention is drawn to the detailed description of the initial preferred aspect which may be interpreted by referring to the accompanying drawings, in which.

DETAILED DESCRIPTION OF THE APPLICATION

The present application provides a multi-directional fluid velocity measurement device which is suitable for measuring three dimensional characteristics of fluid flow and is particularly suited to measuring air flow. It will be appreciated in the context of the description which follows that by three dimensional is meant that the fluid velocity is measured about three orthogonal axis (x, y and z) rather about a single plane defined by two axis (x,y). It will be appreciated from the description that follows that there a number of different features, some of which provide an advantage on their own and others which provide an advantage in combination with one or more other features. Each of these advantages is to be taken as being separate and divisible from the others with the result that only those features necessary to provide an individual advantage may be employed in a FVMD.

In general terms, the device comprises a main body. The main body functions as a support for a plurality of Pitot tubes. The main body is suitably substantially spherical in nature, i.e. the outer surface of the main body is substantially spherical.

The main body may also function as a housing for sensors and associated electronics. The main body may also house a power source, e.g. a battery or battery pack, for powering the sensors and associated electronics. The main body may be pneumatically sealed to the atmosphere. At the same time, the main body may be formed from or coated in a plastics material to reduce the effects of exposure to the atmosphere, e.g. corrosion.

To facilitate access to the inside of the main body, the main body may be formed as two separate hemispheres. The hemispheres are suitably configured to engage with each other. Thus, for example, the hemispheres may have co-operating flanges that overlap and engage with one and other allowing for a friction fit between the hemispheres. A locking feature, e.g. locking nut or similar feature may be provided to lock the hemispheres together.

The main body is supported by a support structure. The support structure may for example be a pole. A support engaging feature may be provided on the main body for removably engaging with the support structure. Suitably the support engaging feature is provided at the bottom of the main body. A locking feature may be provided to lock the support engaging feature to the support structure. The support structure and engaging feature may also be configured to provide a power and/or data connection to the associated electronics within the main body.

The plurality of Pitot tubes extend from the surface of the main body. Each Pitot tube has a proximal end which engages with the main body and a distal end remote from the main body. The effective length of the Pitot tube, which may be taken as the distance between the distal end and the proximal end is suitably selected so that the distal end (measurement point) of the Pitot tube is a sufficient distance from the outer surface of the main body such that the pressure readings taken by the Pitot tubes are not substantially corrupted by the localized pressure variations created by the wind flowing over the main body.

More specifically, the sufficient distance should be selected to correspond at least to the radius of the main body. More desirably, the distance is at least twice the radius of the main body. At the same time, it is desirable to limit the distance so that there is not a significant distance between the ends of pairs of Pitot tubes arranged opposite each other about the spherical main body so as to minimise temporal and spatial variations in measurement. Accordingly, the sufficient distance should be selected to be less than ten times the radius of the main body.

At the same time, the Pitot tubes and housing may be designed to co-operate together to minimise air flow distortion.

Thus the shape of the main body may be shaped at the interface to the Pitot tubes to present a continuous curved surface to air flow rather than the Pitot tube external surface joining the connecting main body surface at an abrupt angle of 90°.

Each of the Pitot tubes has a measurement port provided at its distal end. The measurement port is in fluid communication with an opening at the proximal end of the Pitot tube, which in turn is in fluid communication with a respective pressure sensor.

The Pitot tubes are arranged in a 3D configuration/pattern about the main body. Thus the overall arrangement of the Pitot tubes is not co-planar. The arrangement of Pitot tubes in a 3D configuration allows for the measurement of fluid flow in 3 dimensions. Advantageously, the 3D configuration allows for the measurement of one or more of: wind shear, wind flow inclination, vertical wind vectors and wind turbulence characteristics. The number of Pitot tubes is suitably selected to be more than is actually required to present a reasonable 3D measurement. The advantage of this is that the system has inherent redundancy. Accordingly, the failure of a measurement from any Pitot tube (e.g. by blockage) or associated sensor will have a minimal impact on the overall quality of the data output from the instrument. Such a feature is of great utility given the likely desire to position some devices at heights up to and exceeding 100 m for example on meteorological mast installations.

It is appreciated that the FMVD instrument is not intended to be hand held and in fact in the form shown is a relatively large device compared for example to a hand-held anemometer. For example, the radius of the main body may be of the order of 5 to 20 cm. At the same time, the instrument will probably be making measurements at a quite a distance from the ground, e.g. 100 meters above the ground. It may also be used for extended periods of time of the order of months.

Accordingly, ensuring the device is easy to install and reliable in use is important. In one aspect, this inherently provided by avoiding the use of moving parts (as found for example in cup anemometers and wind vanes).

The device provides for this by providing the device in modular form, for example the two-hemisphere construction of the main body. At the same time, the Pitot tubes and main body are removeably engageable with one and other. More specifically, the main body provides a plurality of sockets in the outer surface. Each of the sockets is configured for engagement with the proximal end of a Pitot tube. The sockets may be proud of the outer surface in which case they may be shaped to minimise disruption to the air flow about the main body. The advantage of shaping (in a curve) the effective interface between the Pitot tube and main body is that the required length of Pitot tube may be reduced.

Having the Pitot tubes removable allows for a faulty/blocked Pitot tube to be replaced in situ without replacing the entire instrument. Equally, it allows for the installation and alignment of the main body at a site and the subsequent addition of the Pitot tubes. The socket to Pitot tube connection may be a screw fit to ensure a reliable connection. Although other configurations are possible including push fit or a push and twist lock fit. In any event, the connection is preferably selected to allow for the removal/installation of the Pitot tubes by hand to avoid the need for the use of tools at height. The opposite side of each socket to the Pitot tube is in fluid communication with a pressure sensor. Thus in one configuration, the sensor is integrated with the socket and in another configuration the sensor is connected to the socket by means of a flexible tube or similar structure.

A further advantage of having removable Pitot tubes is that it uniquely provides the user with the flexibility to change, with considerable ease, the nose-profile of each of the pitot-tubes (and for example to thereby change the overall dynamic response characteristics of the instrument).

At the same time, as the instrument is intended for use in all environmental conditions, certain measures may be provided to protect the instrument from the environment and in particular the features of snow and ice. It will be appreciated that the associated electronics within the main body will generate heat which in itself may be sufficient to prevent freezing on the outer surface of the main body. However, in the event that this is not the case, one or more electrical heating elements may be provided about the surface of the main body. A thermostat may be provided within the housing (e.g. as part of the associated electronics) to operate the heating elements where the temperature of the air or surface of the main body drops below a threshold temperature. Similarly, Pitot tubes may be provided with a heating element to prevent their freezing. An electrical connection may be provided to these heating elements by electrical contacts provided in or about the sockets which engage with corresponding electrical contacts on the Pitot tube. Using heating elements, the instrument can reasonably be expected to withstand ambient temperatures within a range of ±40° C. The heating elements may be in the form of a self-regulating tape or cable which may be moulded in the housing or Pitot tubs. An example of such a self-regulating cable is FREEZ-STOP™ which is available from OEM Heaters of Minneapolis, USA (www.oemheaters.com).

Additionally, or in place to the heating elements, the external surface of the main body or the pitot-tubes or both may be treated using a hydrophobic coating to repel water including precipitation.

The pressure sensors are suitably low pressure digital transducers which provide a digital output rather than analogue output signals thereby eliminating the need for expensive signal conditioning/amplification and A2D conversion technology. Deployment of such sensors has the added benefit of streamlining the data acquisition process thus avoiding any possible error accumulation associated with signal conditioning, amplification, conversion and/or calibration circuitry. The use of such transducers allows for housing the sensors within a smaller main body, which means that the pressure transducers may be located in as close a physical proximity as possible to the input quantity of interest so as to avoid any phase lag with respect to the true pressures at the dynamic pressure points of the various pitot-tubes.

At the same time, the main body may be employed to house the associated electronics. These electronics allow for capturing real-time fluid flow profiles in three dimensions, i.e. as obtained from measurements from the pressure sensors. The electronics may be configured to provide direct and instantaneous data output on flow speed, flow inclination, shear, and turbulence characteristics. With the arrangement of Pitot tubes, this provides for a capture- or cone-angle as near as practicable to 360°. The electronics may also be used to detect blocked or otherwise faulty Pitot tubes by analysing the data for inconsistent measurements. Where a blocked tube is identified, the system may address it in a number of different ways. In a first approach, the system may simply send a message to a supervising system/user informing of the blocked tube and in response to which a user can be dispatched to replace/unblock the tube. In a second, the system may turn on a LED or other indicator (not shown) on the surface of the spherical housing adjacent to the blocked tube to indicate to a user that a blocked tube has been detected and to identify the blocked tube.

In another approach, a back wash\flush feature may be provided allowing a source of pressurised gas to be connected to the proximal end of the Pitot tube to block out the blockage from the tube. In general terms, the source of pressurised gas may be housed remote from the housing, e.g. a $CO_2$ or compressed air cylinder and connected by a flexible pipe to the spherical housing. At the same time, a valve connection (operable by the electronics) may be provided to connect the source of pressurised gas to the Pitot tube. To prevent damage to the sensors the valve connection may at the same time as connecting the pressurised air to the Pitot tube disconnect the sensor from the tube. It will be appreciated that the back flush feature may be used periodically (i.e. to prevent a blockage building up) or in response to the detection of a blockage or a combination of the two.

The electronics may include a data recorder comprising a processor and associated memory. The memory allows for the recording of measurements. The size and nature of the memory may be selected based on the measurement duration intended and whether a data connection is available or not to off-load recorded measurements. An interface is suitably provided to allow the processor acquire measurements from each of the pressure sensors. At the same time, the electronics may include one or more communications modules to facilitate sending measurements to systems remote from the instrument. Thus, the electronics may include a real-time processor, a user-programmable FPGA, and built-in I/O capability and peripherals such as, for example, USB, RS232, RS485, CAN, SD, and Ethernet connectivity. The Ethernet connectivity may be by means of a wireless (e.g. WiFi™) connection or by means of a wired (e.g. Ethernet) cable. Equally, other forms of communication may be provided included for example, GSM, GPRS, 3G or 4G mobile phone connections. Additionally, the electronics may include an interface for one or more environmental sensors including for example measuring one or more of temperature, humidity, barometric pressure and rainfall. It will be appreciated that certain of these sensors may be provided on the main body and that others may be positioned a distance therefrom to avoid interfering with the airflow around the housing, in which case the interface may be wired or wireless. The advantage of using an Ethernet cable is that POE (power over Ethernet) may be used to provide power to the electronics.

Other sensors may be connect It may also incorporate three-dimensional accelometry, gyroscopy or magnetometry sensors. These allow for the orientation of the instrument to the ground to be determined. The electronics may also include for example a GPS receiver to allow an accurate determination of the position of the instrument.

The added advantage of such an arrangement is the elimination of the associated cost and complexity of design commensurate with the routing of long lengths of pressure tubing through the instrument to a remote data acquisition module as is described in the prior art.

A power source, e.g. battery or battery pack, may be housed within the main housing. A power connection may be made to the main housing (for example through the support) in place of or addition to the power source.

The present application will now be described with reference to an exemplary construction employing a configuration of 64 Pitot tubes which is illustrated in FIGS. 1 through 4.

Figure 1:
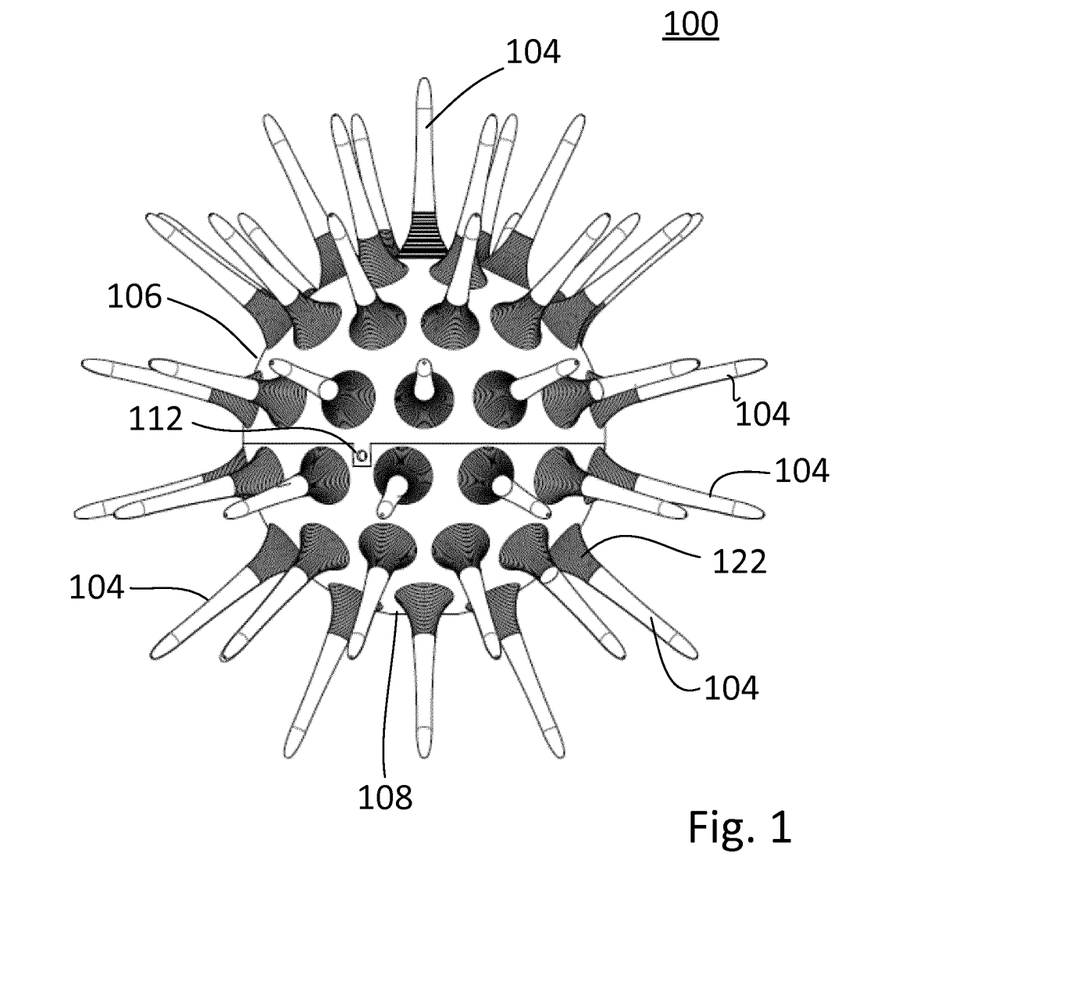
FIG. 1 is a pictorial representation of an FVMD instrument in accordance with an exemplary aspect of the present application.
Figure 2:
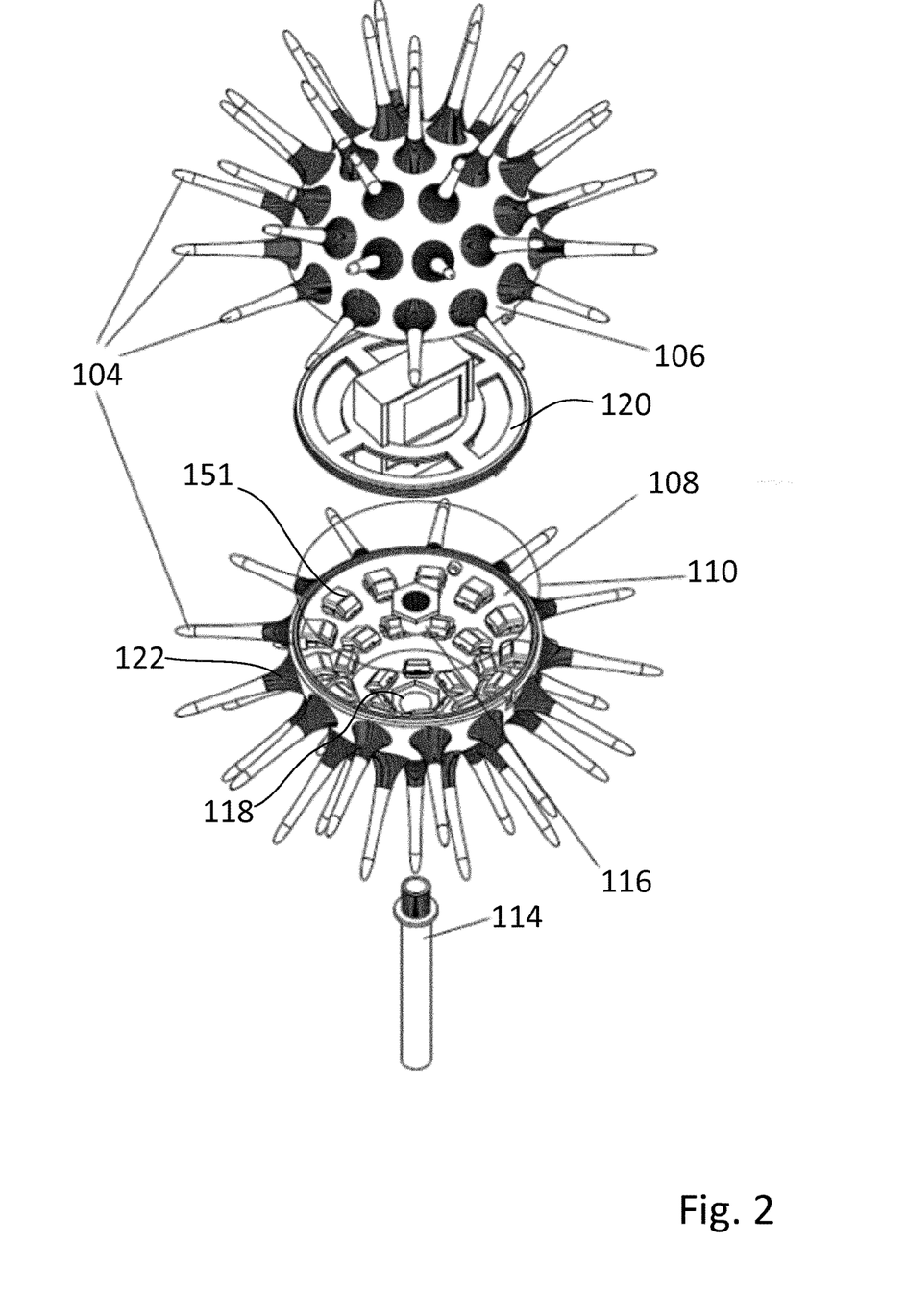
FIG. 2 is an exploded view of an exemplary Higher Level Assembly of the FVMD instrument of FIG. 1.

FIG. 1 depicts a general view of the assembled FVMD instrument in accordance with an exemplary first aspect of the present application. The instrument comprises a central support sphere 102 with 64 pitot-tubes 104 positioned around the surface of the central support-sphere. The central support sphere is formed as two parts: a top-hemisphere 106 and a bottom-hemisphere 108. Suitably, a seal is provided between the top and bottom hemispheres to pneumatically seal the interior to the atmosphere. The seal may for example be an O-ring 110. At the same time one or more locking features 112 may be provided to keep the two spheres together.

Depending on the application, it will be appreciated that the pattern of Pitot tubes may be varied. Thus, for example, in a situation where there is a generally horizontal laminar airflow, the pattern of Pitot tubes may be positioned close to the equator (in geographical terms) of the spheres with a set of Pitot tubes about the equator and one of more sets of Pitot tubes arranged at a latitude above and/or below the equator, for example at 15° above/below the equator. In contrast, where the application is measuring downdraft at an airport, a Pitot tube may be located at the North Pole of the sphere with a further set of Pitot tubes arranged at latitude of 15° below the North Pole.

In the exemplary pattern shown, the positioning of the pitot-tubes around the central support-sphere is based on an application of recursive zonal equal area partitioning of the sphere into 65 separate regions, with 64 pitot-tubes located normal to the surface of the sphere in the centre of each region (the bottommost zonal partition/region is left free for the mounting arrangement, comprising a support 114 which engages with an opening 118 in the bottom of the bottom hemisphere and which is locked in place by means of a locking bolt 116 or similar). As mentioned above, it will be appreciated that the dispersion pattern of the pitot-tubes on the surface of the sphere is application-specific and may be in any variety of configurations, for example at the 20 vertices of a dodecahedron.

Within the hemispheres, a central support structure 120 is provided which in turn is used to house the electronic circuitry. As shown in the exemplary construction of FIG. 4, the support structure comprises a top housing 200, a bottom housing 208, a left side housing 212, a right side housing 204 and a faceplate 206 which co-operate together to house electronic circuitry 210.

In general operation, once the device is placed in a flow stream, individual pressure signals are continuously received at the distal points of each of the pitot-tubes. These pressure signals propagate at a known speed through the pitot-tubes which are, in turn, connected to individual micro-electro-mechanical (MEM) low pressure sensors/transducers. The totality of the readings from the sensors provides a differential pressure output which—by way of an application of the Bernoullian Equation—may be converted to a fluid velocity output that is typically expressed in either analogue or digitally-encoded format or both. It will be appreciated that this form of pressure signal conversion may be effected using a custom differential MEM; a gage pressure MEM; or two individual and separate MEMs, one for measuring static (barometric) pressure and the other, dynamic pressure. Exemplary MEMs would include, but are not limited to, strain gauge, capacitive and piezoelectric types. The mean fluid velocity (or vector) will generally be indicated by the pitot-tube returning the highest pressure reading (hereafter the incident tube). Although, it will be appreciated, that even greater directional accuracy may be computed by triangulating the true pressure vector by including in the calculation the pressure readings not only from the incident tube but also the (lesser output) readings from the surrounding tubes. It will also be appreciated that the greater the number of individual pressure readings the higher the resolution of the data that is produced.

Specifically, a variation of a multiple-point interpolation algorithm is employed in the present application which begins with the identification of the pressure readings from each of the pitot tubes. A selection of adjacent windward facing pitot-tubes is then made, based on the pressure relative to the maximum measured pressure, and a proscribed minimum detectable pressure. Once this stage in the algorithm is reached, the approximate direction of the incident wind is then calculated as the weighted average orientation of the selected tubes, using the pressure values as the weight factor. At this point, the attack angle of the calculated approximate wind direction is calculated for each selected pitot-tube. The approximate dynamic pressure at the device is calculated using a linear fit of the measured pressures to the known angular response profile of the pitot-tubes. The actual dynamic pressure, and wind direction, are then calculated using a non-linear least squares fit of the measured pressures to the known angular response profile of the pitot-tubes, using the approximated values (as calculated above) as the seed values. The density of the air is applied to the calculation and is calculated using the measured values of air temperature and relative humidity from the externally mounted sensors. The wind speed is then determined from Bernoulli's Equation using the dynamic pressure calculated above, the static pressure sensed by the inward facing port on the transducer, and the density of the air.

Figure 3:
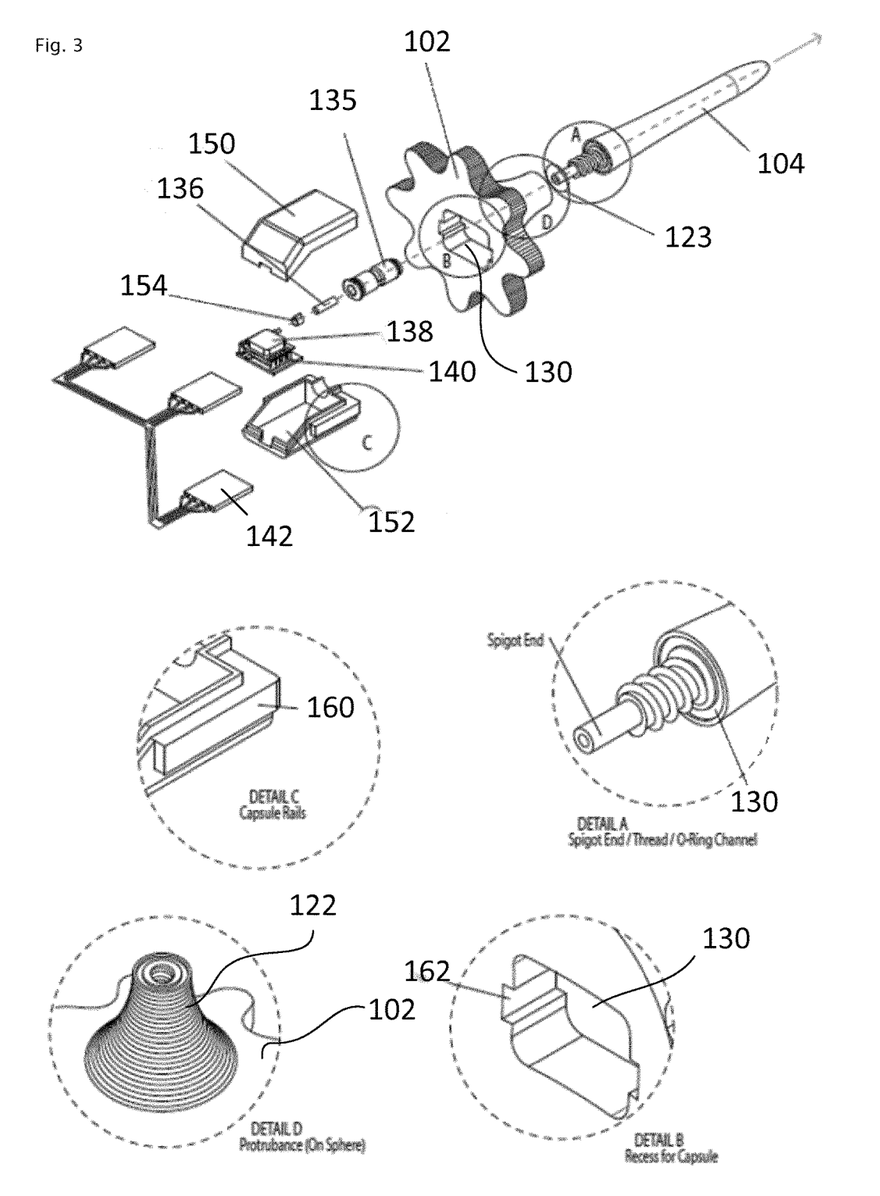
FIG. 3 is a schematic arrangement of the pitot-tube assembly of the exemplary instrument of FIG. 1.

Each pitot-tube assembly, as shown in the exemplary construction of FIG. 3, is designed such that each pitot-tube 104 is easily removable and replaceable for ease of maintenance (or change of application). The custom formed thread on each pitot-tube is intended to co-operate with a respective socket 122 on one of the hemispheres. Thus a Pitot tube may be screwed into a socket. The Pitot tube is suitable formed with a shoulder recess 130. This shoulder recess is employed to retain an O-ring 123 which in turn ensures a pressure seal between the Pitot tube and a corresponding socket on the support hemisphere. The profile of each pitot-tube and the matching protuberances (sockets) on the support hemispheres are designed such that fluid flow distortion around the device is minimised and the extension length of each tube is such that the distal point of each intrudes into the free flow stream. As discussed above, the nose-profile of the pitot-tube is somewhat application-specific and that various nose-profiles may be deployed each having its own particular measured angular response characteristic. Examples of such nose-profiles would be familiar to those skilled in the art but would include, for example but not limited to, NPL, Cetiat and AMCA profiles.

The spigot-end of each pitot-tube, i.e. the extension of the threaded portion, intrudes into the top and bottom support hemispheres via the socket (capsule) recesses 130. A connection is provided between the Pitot tube extension and a pressure sensor. This may be by means of a flexible piece of tube. Alternatively, as shown, the sensors are connected directly to the Pitot tube by means of a Push-In Pneumatic connector 135 being shaped to receive the extension of the Pitot tube and being connected by a short section of flexible polyurethane tubing to a pressure sensor\transducer 138.

Suitably, the pressure transducers deployed are of the surface-mount or SMD variety. Each transducer may be individually mounted onto a custom printed circuit board (PCB) 140 with a right-angled 4-way header pin connector located on the underside of the PCB to make connections to the electronics. A length of polyurethane tubing is fixed onto the dynamic pressure port of each transducer and sealed with a specialised 2-ear precision clamp 154 for a uniform compression seal. The trailing end of the polyurethane tubing is further attached to a push-in pneumatic connector 135. This sub-assembly is further enclosed in a custom-designed two-piece capsule housing 151. The two-part capsule housing 151 comprises a capsule upper 150 and a capsule lower 152. The two-part housing acts both as a locator slide mechanism engaging with the interior side of a socket and also providing a moderate environmental seal. When this sub-assembly, including the two-piece housing, is pushed through the interior side of a socket (capsule recesses) in either the top or bottom hemispheres. Rails 160 on the sides of the housing engaged in corresponding slides 162 on the capsule recess ensure a snap-fit connection is made between the pneumatic connector port and the spigot-end of each pitot-tube. It will be appreciated that this is but one configuration of the device. For example, a single or double-sided PCB with a plurality of surface-mounted sensors connected via separate lengths of polyurethane tubing to the spigot-end of the pitot-tubes may also be deployed.

Figure 4:
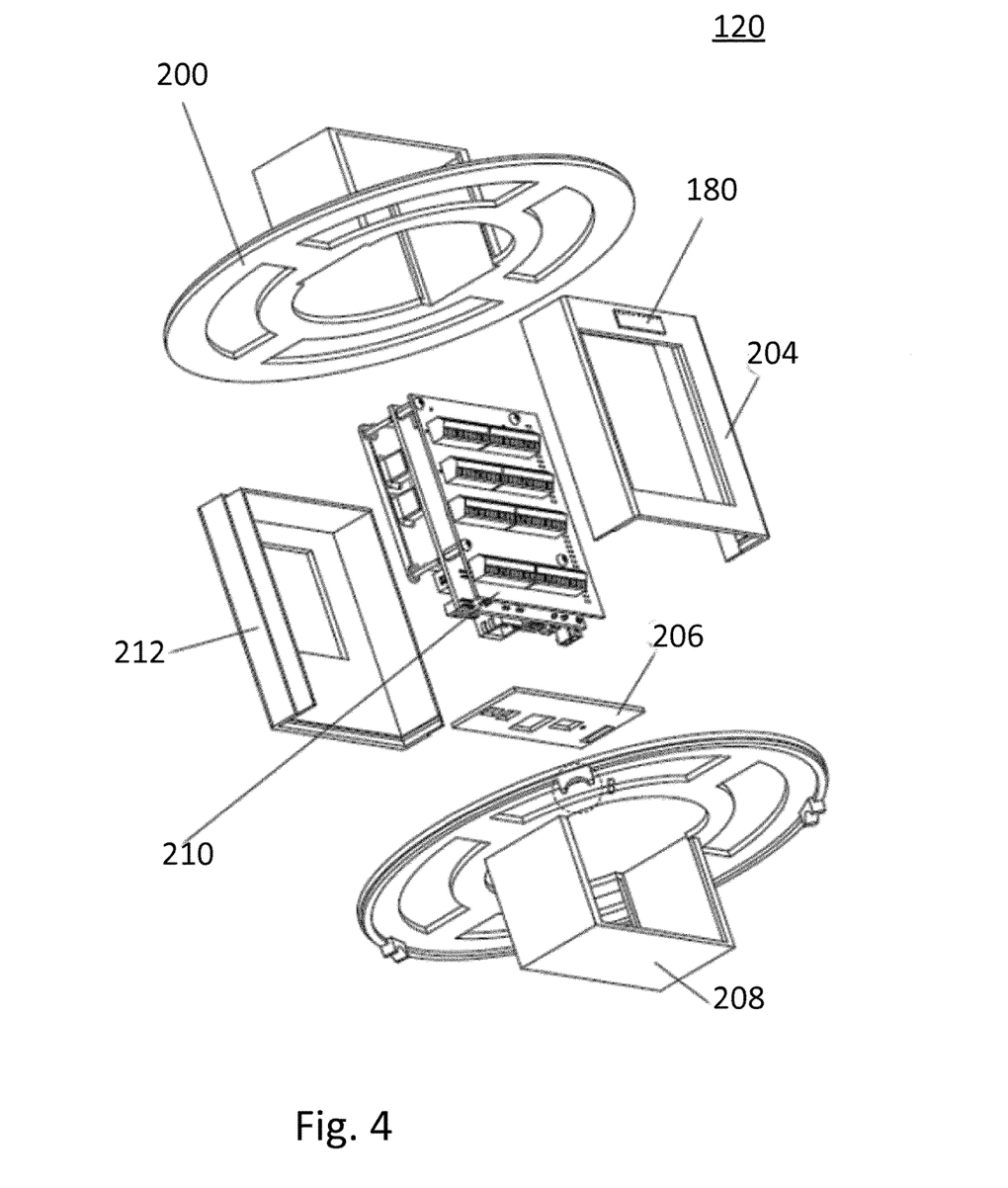
FIG. 4 shows the arrangement of an exemplary Control & Acquisition Module for use in the instrument of FIG. 1.

In the arrangement shown, a differential pressure output from each individual transducer is set up to communicate with an off-the-shelf reconfigurable embedded control and acquisition system that consists of a real-time processor; a user-programmable Field Programmable Gate Array (FPGA); built-in heat-sink; I/O and USB, RS232, RS485, CAN, SD, peripherals and Ethernet port. These electronics (i.e. a control and acquisition system module) are housed in casing, which is shown in FIG. 4 as being formed from 5 parts which serves to both provide moderate environmental protection and to suspend the device in a known position in the approximate centre of the FVMD instrument.

The means of communication between the sensors and the control and acquisition module may be by means of any suitable communication, for example the I$^2$C (Inter-Integrated Circuit) protocol. I$^2$C is an open source, serial, single-ended computer bus protocol. The exemplary configuration employed in the current application makes use of six separate I$^2$C buses (4 with 11 sensors each and two with 10 sensors each) to transfer data to the FPGA. It will be appreciated that the use of this method reduces the wiring required between the electronics and the sensors since multiple sensors may be connected to a single cable and thus a single end connector made to the electronics. A seventh I$^2$C bus is included to provide data from the various externally mounted sensors required to resolve Bernoulli's Equation (i.e. relative humidity, atmospheric pressure and temperature). The individual Capsule Assemblies are assembled into the unit such that no sensor's immediate neighbour is on the same bus. Such a configuration provides an element of built-in redundancy for the FVMD instrument in that it prevents an entire area of the sphere becoming inactive in the event of a single bus becoming inactive.

In addition—on the seventh I$^2$C bus—there is a system-in-package sensor featuring 3D digital linear acceleration sensing capability; 3D digital angular rate sensing; and, 3D digital magnetic sensing. This inertial measurement unit (IMU) sensor 180 is internally mounted in a known position within the sphere and is (algorithmically) referenced to the distal locations of each of the dynamic pressure points on the pitot-tubes such that each distal point can be accurately located in space and time regardless of the instrument's orientation to detectable magnetic fields, and/or regardless of any vibration of the mounting boom or deflection of the instrument howsoever caused. The inclusion of the IMU sensor 118080 eliminates the need to manually align the FVMD instrument with a reference orientation such as true north.

The construction of FIGS. 1 to 4 are presented in the context of using the device outdoors. It will be appreciated that the structure may also be employed indoors, for example for measuring air flow, within a data centre or similar application. Where the device is intended for interior use, it will be appreciated that a smaller spherical body may be required to reduce the lengths of the Pitot tubes and thus the overall size of the instrument. In this context, certain functional aspects may be moved from within the spherical body to reduce the size of the spherical body. For example, the electronics section 120 may be relocated outside of the body with the I$^2$C connections been made to electronics housed externally to the device, e.g. by wiring through a hollow support 114. Similarly, the sensors may be removed from the housing and connections, e.g. flexible tubing, used to connect the Pitot tubes to the sensors remote from the spherical body again potentially through a hollow support 114. It will equally be appreciated that these techniques used indoors may also be employed in an outdoor construction.

Whilst the device of the present application has been described in the context of obtaining a three dimensional measurement of fluid velocity and in more particularly a three dimensional measurement of air velocity, the device may be modified for other purposes. Accordingly, in one configuration, the pressure sensors within the pitot tubes may be replaced with microphones so as to provide a three dimensional acoustic measuring device with appropriate changes made to the electronics to accommodate recording pressure from the sound rather than pressure from the wind as such. Accordingly, whilst such a device is not claimed below, the application should be taken as extending to such a device and in particular a device for measuring sound in three dimensions is contemplated in accordance generally with the claims which follow except that the pressure sensors are replaced by microphones.

It will be appreciated that such an arrangement presents advantages in that the pitot tubes inherently receive sound from the direction in which they are pointing and discriminate sounds coming from different directions. This means that less expensive microphones may be employed to capture the sound in contrast to existing systems which use directional microphones configured in a 3 dimensional array. At the same time, the system has an advantage that sensitive components such as the microphones, audio electronics and data storage or analysis electronics are protected within the body of the sphere or within the pitot tubes. This may be useful in rugged environments or situations where it may be difficult to protect a conventional microphone array. The external surface of the sphere or pitot tubes or both may be covered in a sound absorbing or insulating material. This ensures that the sound reaching an individual microphone is limited to those arriving in-line with the Pitot tube.

In addition the direction in which the sound is coming from may be readily determined. In its simplest form, this may be achieved by selecting the Pitot tube whose microphone records the highest sound level and selecting the outward direction of the Pitot tube as being in the direction from which the sound has come. For greater accuracy, a cluster of measurements may be employed and the direction of the sound obtained by triangulation. For example, by selecting the readings from a cluster of microphones, for example three, with the highest measured sound levels. Using the measured sound levels from the cluster, a triangulation may be performed to more accurately determine the direction from which a sound is originating.

One application for this is that, the sound measurement system may be integrated with a security system. In this arrangement, a pre-determined noise threshold may be used as a security sensor. Where the pre-determined noise threshold at one of the microphones is exceeded, the security system is triggered. Whilst such a security sensor would be known generally, an advantage of the present system is that once a sound is detected its direction of origin determined. Thereafter, the security system may be configured to activate one or more cameras to record/transmit a picture/video of the area identified by the detected direction of origin. This may for example, be by means of switching on a camera which is directed in the general direction from which the sound has come. Alternatively, it comprise a robotic camera having one of tilt or axis control or both and where the security system is configured to control the camera to point in the direction from which the sound has come.

The present application has been described here in connection with certain preferred aspects which are intended as examples only.

The invention claimed is:

1. A multi-directional fluid velocity measurement device for measuring three dimensional characteristics of fluid flow, the device comprising:
   a main body having a substantially spherical outer surface;
   a support for supporting the main body;
   a plurality of Pitot tubes, each of the Pitot tubes extending outwardly from a proximal end at the main body to a distal end;
   a plurality of pressure sensors, arranged within the main body, each pressure sensor being in fluid communication with a respective one of the Pitot tubes, wherein the Pitot tubes are distributed about the outer surface in three dimensions wherein the distal end of each Pitot tube is a sufficient distance from the outer surface of the main body such that the pressure readings taken by the Pitot tubes are not substantially corrupted by the localized pressure variations created by the wind flowing over the main body; and
   a plurality of sockets arranged about the main body, wherein each socket is in fluid communication with a pressure sensor and where the Pitot tubes are removably engageable with the sockets.

2. A device according to claim 1, wherein the sufficient distance is at least the radius of the main body.

3. A device according to claim 2, wherein the sufficient distance is between twice and ten times the radius of the main body.

4. A device according to claim 1, wherein the removable engagement is such that a Pitot tube may be removed by hand.

5. A device according to claim 4, wherein the removable engagement comprises the use of screw fit connection, push-fit connection or a push and twist fit connection.

6. A device according to claim 1, wherein the pitot tubes and socket are shaped to present a continuous curved surface at the pitot tube-socket interface to minimise disruption to airflow.

7. A device according to claim 1, wherein a heating element is provided on each Pitot tube to prevent icing.

8. A device according to claim 1, further comprising at least one additional sensor, wherein the at least one additional sensor comprises one or more of the following:
   a) a temperature sensor;
   b) b) a humidity sensor;
   c) c) a barometric pressure sensor; and
   d) d) a rainfall sensor.

9. A device according to claim 1, wherein the main body comprises two hemi-spheres which are removably connected to one and other.

10. A device according to claim 9, wherein a seal is provided between the two hemi-spheres.

11. A device according to claim 1, wherein the number of Pitot tubes is more than required to provide measurement of fluid flow in three dimensions.

12. A device according to claim 11, wherein the number of Pitot tubes is 64.

13. A multi-directional fluid velocity measurement device for measuring three dimensional characteristics of fluid flow, the device comprising:
   a main body having a substantially spherical outer surface;
   a support for supporting the main body;
   a plurality of Pitot tubes, each of the Pitot tubes extending outwardly from a proximal end at the main body to a distal end;
   a plurality of pressure sensors, arranged within the main body, each pressure sensor being in fluid communication with a respective one of the Pitot tubes, wherein the Pitot tubes are distributed about the outer surface in three dimensions wherein the distal end of each Pitot tube is a sufficient distance from the outer surface of the main body such that the pressure readings taken by the Pitot tubes are not substantially corrupted by the localized pressure variations created by the wind flowing over the main body; and
   a data recorder for recording data obtained from each of the pressure sensors, wherein the data recorder is housed within the main body.

14. A device according to claim 13, wherein the sufficient distance is at least the radius of the main body.

15. A device according to claim 14, wherein the sufficient distance is between twice and ten times the radius of the main body.

16. A device according to claim 13, further comprising a power source for powering the data recorder, wherein said power source is also housed within the main body.

17. A multi-directional fluid velocity measurement device for measuring three dimensional characteristics of fluid flow, the device comprising:
   a main body having a substantially spherical outer surface;
   a support for supporting the main body;
   a plurality of Pitot tubes, each of the Pitot tubes extending outwardly from a proximal end at the main body to a distal end;
   a plurality of pressure sensors, arranged within the main body, each pressure sensor being in fluid communication with a respective one of the Pitot tubes, wherein the Pitot tubes are distributed about the outer surface in three dimensions wherein the distal end of each Pitot tube is a sufficient distance from the outer surface of the main body such that the pressure readings taken by the Pitot tubes are not substantially corrupted by the localized pressure variations created by the wind flowing over the main body; and a connector defined in the main body for removably engaging with the support.

18. A device according to claim 17, wherein the sufficient distance is at least the radius of the main body.

19. A device according to claim 18, wherein the sufficient distance is between twice and ten times the radius of the main body.

* * * * *

UNITED STATES PATENT AND TRADEMARK OFFICE
CERTIFICATE OF CORRECTION

PATENT NO. : 10,317,422 B2
APPLICATION NO. : 15/553563
DATED : June 11, 2019
INVENTOR(S) : Derek Kearney and Brian Kearney Page 1 of 1

It is certified that error appears in the above-identified patent and that said Letters Patent is hereby corrected as shown below:

On the Title Page

Title: Replace:
"MULTI-DIRECTIONAL FLUID VELOCITY MEASUREMENT DEVICE (FVMD)"
With:
"A MULTI-DIRECTIONAL FLUID VELOCITY MEASUREMENT DEVICE (FVMD)"

Assignee: Replace:
"Technological University of Dublin"
With:
"Technological University Dublin"

Signed and Sealed this
Fifth Day of November, 2019

Andrei Iancu
*Director of the United States Patent and Trademark Office*